United States Patent [19]
Kuismi

[11] 3,908,300
[45] Sept. 30, 1975

[54] TROLLING RIG

[76] Inventor: Gust M. Kuismi, 305-21st Ave., East, Ashland, Wis. 54806

[22] Filed: Oct. 1, 1974

[21] Appl. No.: 511,069

[52] U.S. Cl. .............................................. 43/43.13
[51] Int. Cl.² .................... A01K 91/00; A01K 93/00
[58] Field of Search ........................ 43/43.13, 43.12

[56] References Cited
UNITED STATES PATENTS

| | | | |
|---|---|---|---|
| 1,606,240 | 11/1926 | Klaserner | 43/43.13 |
| 2,545,185 | 3/1951 | Winslow | 43/43.13 |
| 3,134,189 | 5/1964 | Hubbart | 43/43.13 |
| 3,470,649 | 10/1969 | Cole | 43/43.13 |

*Primary Examiner*—Robert Peshock
*Assistant Examiner*—Daniel J. Leach
*Attorney, Agent, or Firm*—Peck & Peck

[57] ABSTRACT

Trolling rigs for controlling a plurality of fishing lures, the rigs being towed from a single boat and being laterally and rearwardly positioned with respect thereto. Each rig includes a trolling ski having a trigger mechanism on one side thereof and a tow line mechanism on the other side thereof. A manually controlled fishing rod is provided for each ski and the line from the rod for each ski is connected to said trigger mechanism. The fish line or leader to which the lure is attached also is connected to said trigger mechanism and the tow line is releasably connected to the tow line mechanism. When a fish strikes the lure, or when the manually controlled fishing rod is jerked to pull its line, the trigger mechanism is operated to release the fish line so that it then may be manipulated by the fisherman in landing the fish. The tow line release mechanism and the fish line trigger mechanism are so connected that upon operation of the trigger mechanism by the pull on the leader when a fish strikes the lure or upon jerking of the fishing rod, either of these actions automatically causes the tow line mechanism to release the tow line which then slides forwardly relative to the ski to its point of attachment to the ski at the bow thereof so that the ski will then move into position astern of the boat for its retrieval.

16 Claims, 12 Drawing Figures

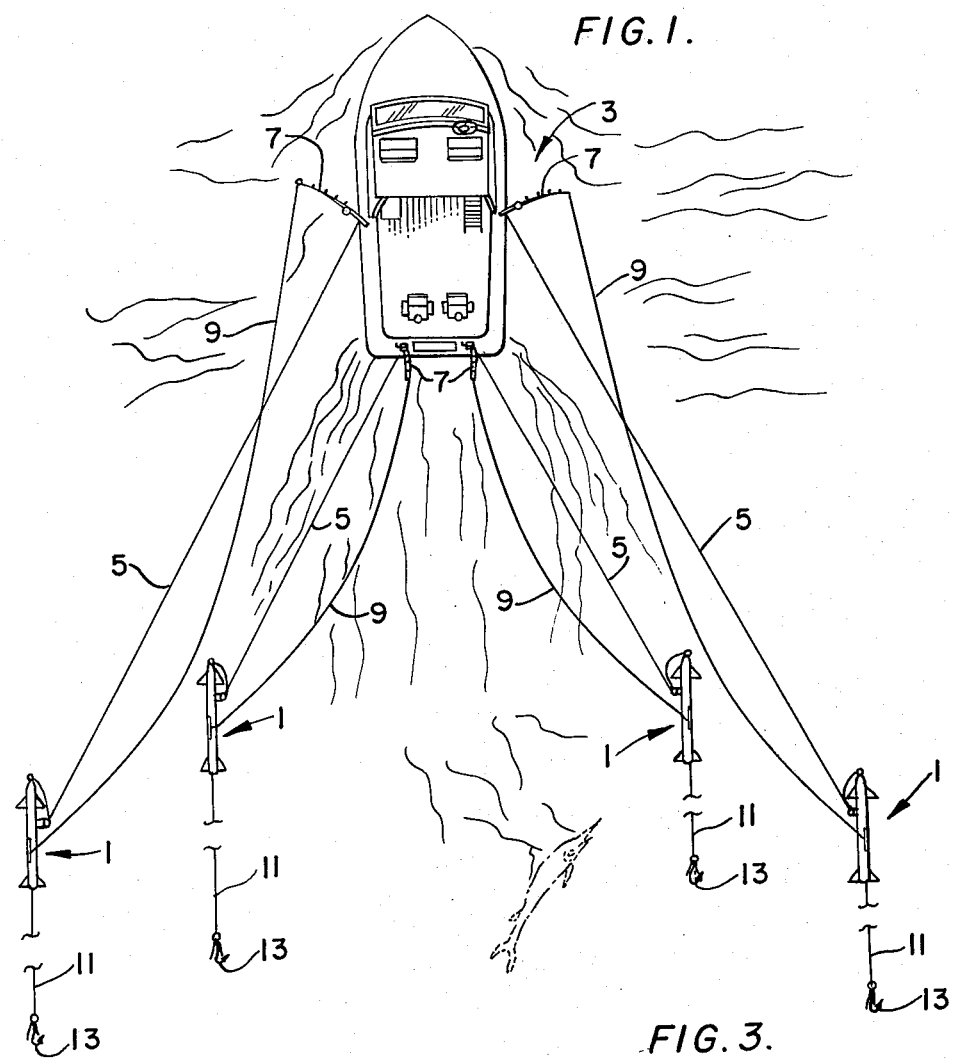
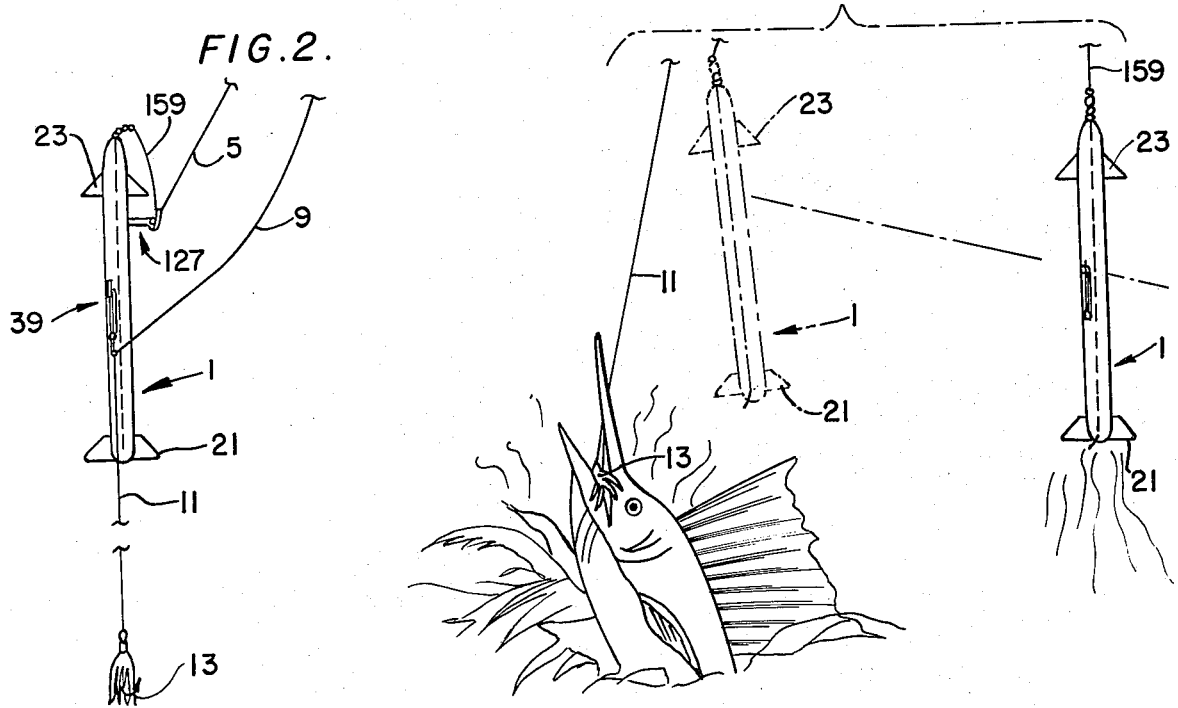

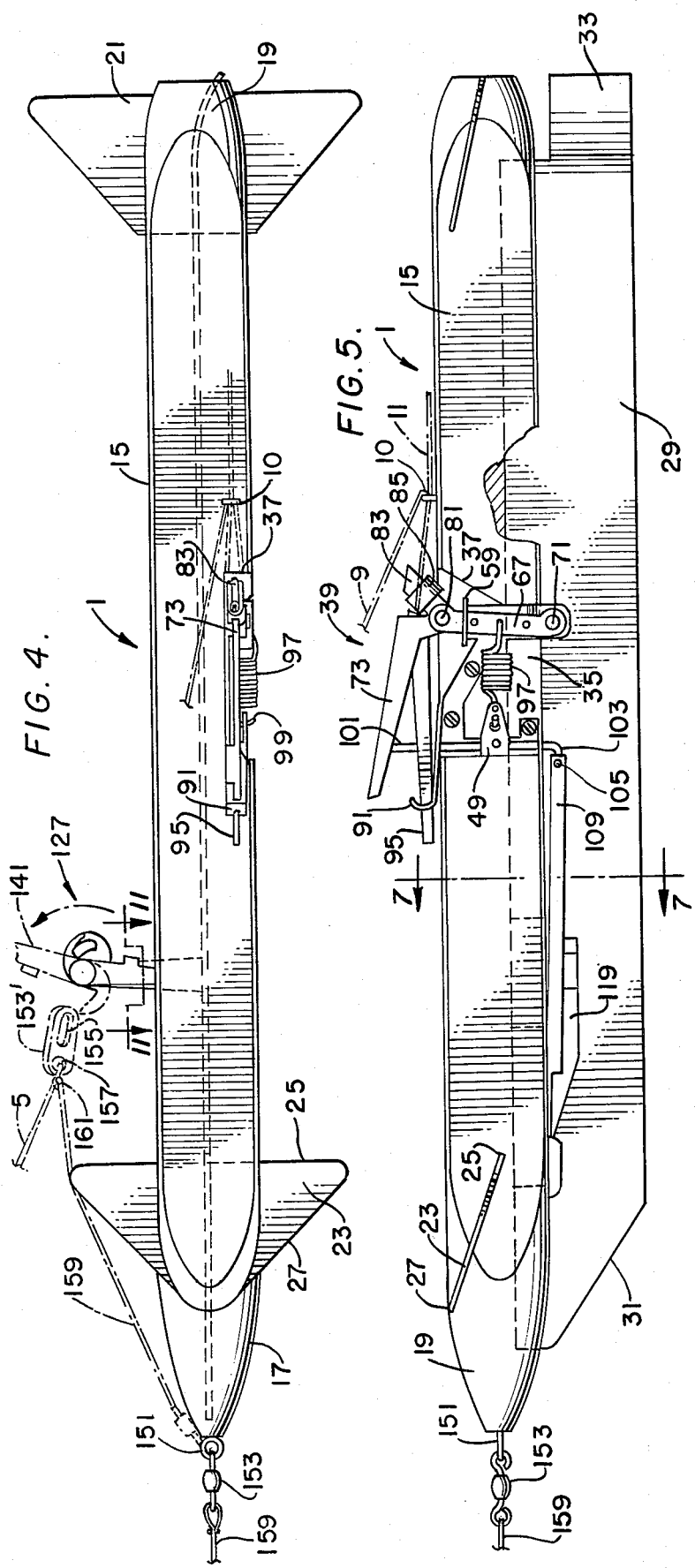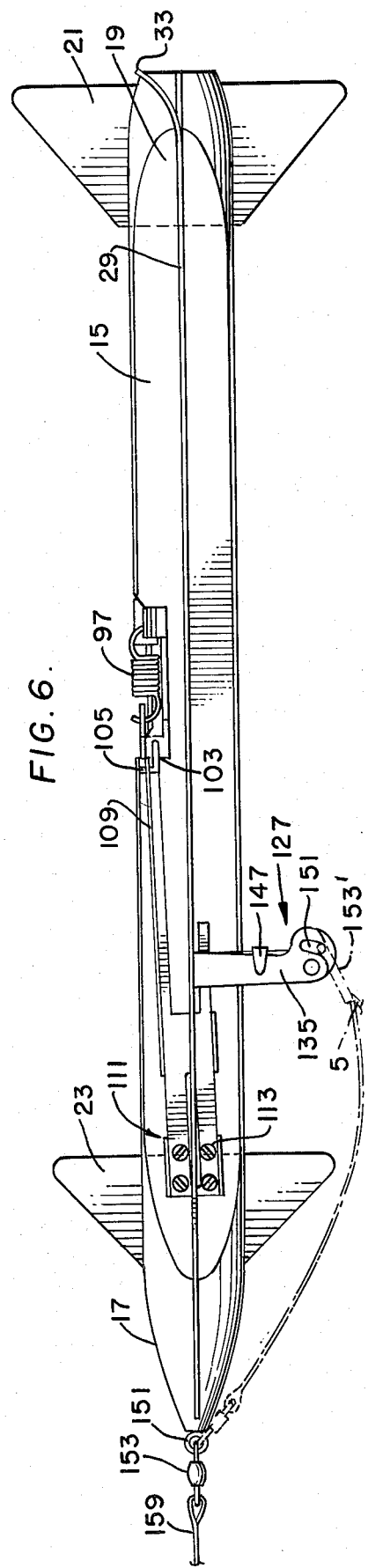

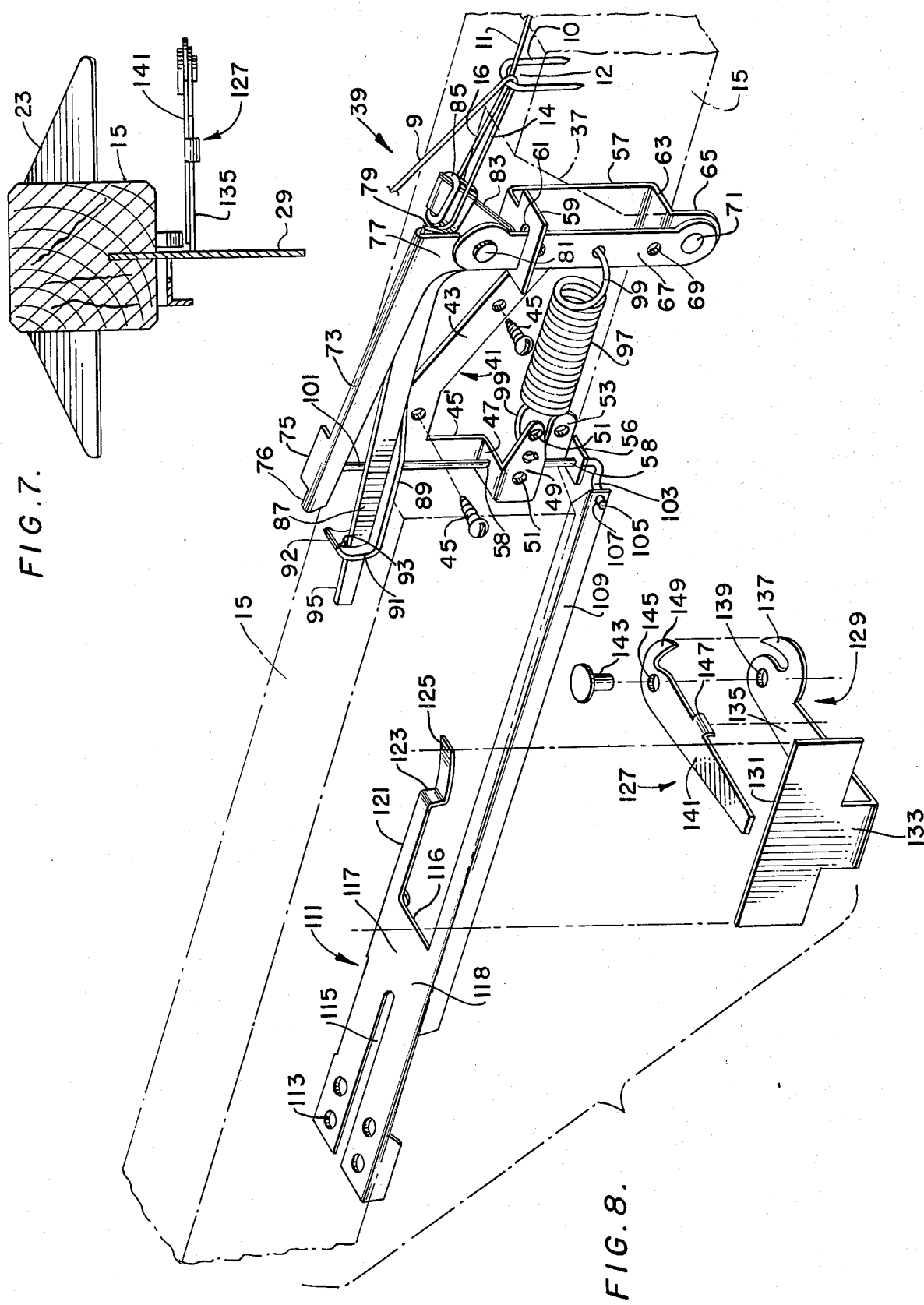

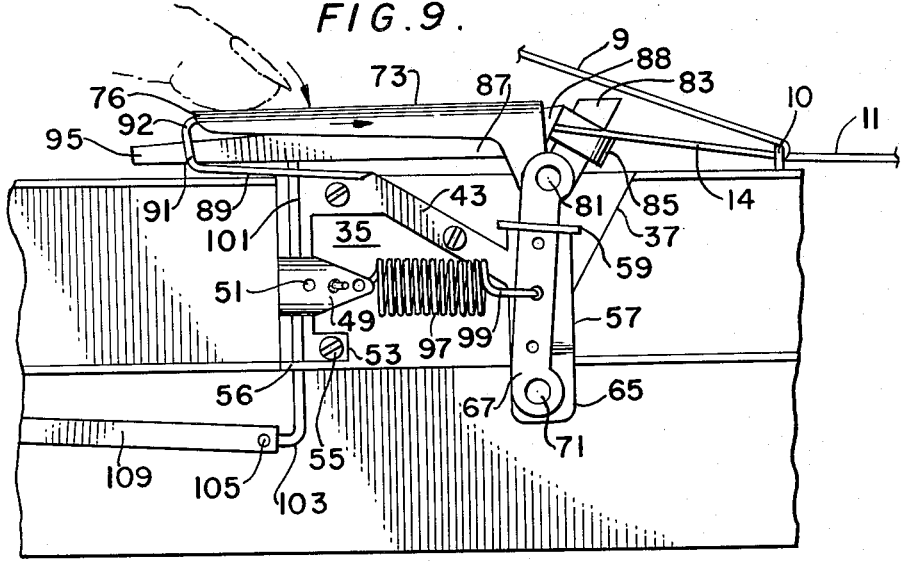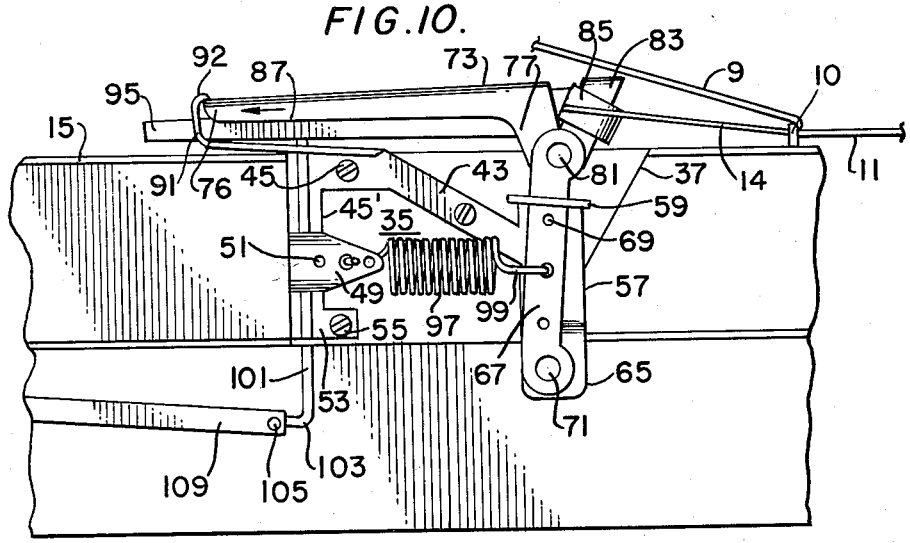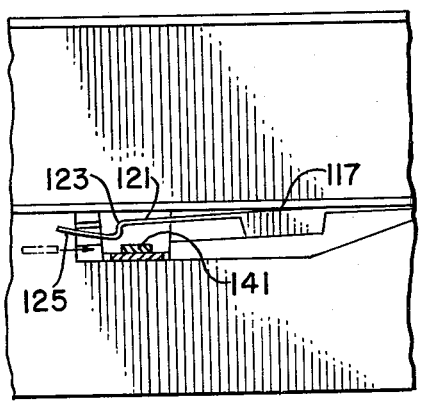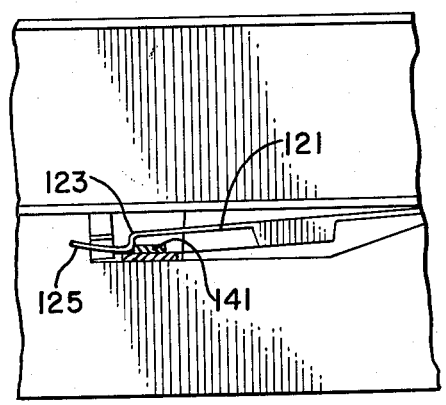

TROLLING RIG

BACKGROUND OF THE INVENTION

This invention appertains to a trolling arrangement whereby multiple lines having fishing lures on the ends thereof may be towed for trolling at one time from a single moving boat without any of the multiple lines becoming entangled when a fish strikes one of the lures, or at any time during the trolling procedure.

The advantages of a system of this character, whereby a single boat may be used in a trolling operation with a multiplicity of trolling lines, will be self-evident as it permits the coverage of a relatively wide sweep of water which would otherwise not be obtainable with a single line from a single boat. As a matter of fact, the system which has been devised permits a wide sweep of approximately 150 feet or more to be covered on each side of a single boat.

A ski, which in this description will be described as a trolling ski which travels on the surface of the water, is employed for each fishing rod having a line, and each of these skis is attached to a lure by means of a leader. The system envisages the placement of the skis in spaced relationship and laterally and preferably rearwardly of the boat which is towing the skis along the surface of the water.

This invention involves certain characteristics whereby spinning rod lines or other rod and reel lines may be used with each individual lure and the system has been so devised that upon the striking of the lure by a fish or by jerking the fishing line, the leader to the lure is automatically detached from the ski for control by the fisherman so that the fisherman for that particular ski may have the sport and use his ingenuity in landing the hooked fish.

SUMMARY OF THE INVENTION

The present invention is designed specifically to allow several fishermen to fish from a single moving boat in a trolling operation and further permits each fisherman to have his own individual line with a fishing lure attached thereto. A trolling ski is provided for each fisherman and the trolling ski is connected to the lure by means of a leader or fishing line and the fisherman's line is connected to the ski until a fish strikes the lure. When this occurs, the leader is automatically released from the trolling ski to the rod of the fisherman so that the individual fisherman for that trolling ski is in full and complete charge of the leader to the lure upon which the fish is hooked, whereupon each individual fisherman may play the fish and land it upon the boat. Means is also provided whereby the fisherman by jerking his rod may cause release of his line from the ski. Each trolling ski for each fisherman is attached at its side to the boat so that it will be towed over the water by the moving boat. The tow line to the boat from each individual ski is attached at the side of the ski and means is provided on the ski to maintain the ski in position laterally of and spaced from the boat until the leader is released from the ski. The means for automatically releasing the leader when a fish strikes the lure or when the fishing rod is jerked is interconnected with further means on a side of the ski to which the tow line from the boat is attached so that when the leader to the lure is released from the ski, the tow line will automatically be released from its attached position at the side of the ski and will then slide forward to the bow of the ski where it is attached, with the result that the ski automatically assumes a position to the stern of the boat for facilitating its retrieval. The arrangement is such that upon a strike by a fish, the ski to which such leader is attached will automatically move to the stern of the boat without in any way becoming entangled with the other lines of the multiple skis which are being towed by the boat.

Each fisherman's line which forms a part of the leader to the lure is detachably secured to the ski until a fish strikes or until the rod is jerked, and this length of the leader is provided with slack, whereby that length of the leader which extends from the fishing rod to the ski will not, prior to striking by a fish, tend to pull the ski laterally toward the towing boat.

BRIEF DESCRIPTION OF THE DRAWINGS

FIG. 1 is a plan view disclosing the towing boat and the multiplicity of lines and trolling skis which are towed thereby.

FIG. 2 is an enlarged plan view of a trolling ski which is rigged for trolling from the port side of the boat.

FIG. 3 is a view illustrating the action of a trolling ski when a fish strikes the lure to automatically release the leader from the ski and to thereby automatically release the tow line from its side attached position on the ski to a bow attached position thereon to thereby permit the ski to assume a position on the water approximately directly aft of the towing boat. The ski is illustrated in phantom lines at the moment of release of the leader and the towing line, and is illustrated in full lines moving towards the position trailing the stern of the towing boat.

FIG. 4 is a top plan view of a port trolling ski illustrating the projecting tow line mechanism for attaching and automatically releasing a tow line from the side of the ski to its position towing the ski from the prow thereof, the tow line being illustrated in phantom lines as it appears during the releasing operation from the tow line attaching and releasing mechanism.

FIG. 5 is a view in side elevation of a ski particularly illustrating the mechanism whereby the leader to the lure is detachably attached to the ski.

FIG. 6 is a bottom plan view of a ski illustrating the keel and the rudder and the means connecting the leader releasing mechanism to the tow line releasing mechanism for the operation of the latter when the former is operated upon a fish striking the lure.

FIG. 7 is a view taken on the line 7—7 of FIG. 5.

FIG. 8 is a perspective view of the attaching and releasing mechanism for the leader and of the tow line attaching and releasing mechanism, with parts thereof shown in an exploded manner.

FIG. 9 is a fragmentary view of the leader attaching and releasing mechanism with the various elements thereof in position being disposed in operative leader triggering condition.

FIG. 10 is a fragmentary view generally similar to FIG. 9 with the parts in operative triggered, or leader releasably holding position.

FIG. 11 is a view taken on the line 11—11 of FIG. 4 with the tow line engaging latch being releasably cocked.

FIG. 12 is a view similar to FIG. 11 with the tow line engaging latch in cocked position.

DESCRIPTION OF THE INVENTION

Referring to the accompanying drawings and particularly FIG. 1 thereof, wherein an array of trolling skis is illustrated, the skis being connected to and towed from a towing boat and being laterally and rearwardly positioned with respect thereto. While four trolling skis are shown in FIG. 1 of the drawings, it is to be distinctly understood that more or less of these skis may be used, this number of skis is disclosed merely for purposes of illustration and not as a limitation. I have designated each trolling ski in its entirely by the numeral 1 and it will be observed that two of these trolling skis 1 are towed by the boat on the port side thereof and two of them are towed by the boat on the starbord side thereof. The reference numeral 3 designates the towing boat and may, of course, be of any desirable size, speed and the like and is adapted to carry, in this particularly disclosed instance, at least four fishermen, one for each of the four trolling skis. Each trolling ski 1 is connected to the towing boat 3 by means of a tow line 5 which is attached to the towing boat in any suitable manner and in any suitable position thereon. As will be explained hereinafter, each towing line for each trolling ski is releasably attached to the side of the trolling ski facing the boat prior to a fish striking a lure. In this instance where four trolling skis are employed, a fishing rod 7 is provided for each ski and, of course, when a fish strikes the lure, as will be made clear hereinafter, the fisherman (not shown) on the boat will manipulate the rod so as to have the sport of playing and landing a fish. A fish line 9 extends from each rod and is releasably attached to a trolling ski at a side thereof as will be explained in detail hereinafter. The fishing line 9 which is releasably attached to the side of the ski is part of and connected to a leader 11 having a lure 13 fixed to the end thereof. Thus, when the trolling operation is in progress, a multiplicity of trolling skis 1 are towed by the towing boat 3 in various laterally spaced positions with respect thereto, the positions being such that during the operation there will be no chance of entanglement of towing lines or fishing lines, and when a fish strikes a lure and the trolling ski automatically travels to the stern of the boat for its retrieval, there will be no opportunity for entanglement of any of the lines used in this trolling rig. It will also be recognized that since each trolling ski is controlled by a separate or independent tow line, the length of these separate and independent tow lines may be varied as desired so that the skis may be towed at selected varying positions with respect to the towing boat. This variable feature of the present invention permits a broader sweep to be covered by the trolling skis so that more fishing area may be covered. It is an advantageous feaature of this invention that ordinary fishing rods and reels may be used instead of cumbersome, heavy trolling equipment and the sensation of fighting the hooked fish is not lost under this system and, as will be shown later in this specification, the trolling skis are not wound into the boat for retrieval, as in former trolling systems.

Each trolling ski is of generally streamlined configuration and consists of an elongated hull section 15 which may be made of white cedar, plastic or any other material having the required characteristics of a trolling ski of this general nature. The trolling ski 1 is formed with a generally conical nose or bow 17 and a stern 19. A preferably metallic stabilizing fin 21 is preferably fixed in a slot within the stern portion of the ski and provides laterally extending wings as is clearly illustrated in FIG. 4 of the drawings. Adjacent to the bow 17 of the trolling ski, but slightly removed aft thereof, is a forward stabilizing fin 23 which like the fin 21 is preferably formed of metal, and this fin 23 is received in a slot in the hull of the ski so that laterally extending wings are provided. Consideration of FIG. 5 of the drawings clearly shows that the forward fin 23 is angled relative to the horizontal so that the trailing edge 25 thereof is downwardly and rearwardly disposed relative to the leading edge 27. It will be understood that this stabilizing fin 23 with its particular inclination will maintain the trolling ski 1 in proper position gliding on the top of the water through which it is being towed. A longitudinally extending keel 29 is fixed in a slot which is provided in the bottom of the hull 15 and the keel extends downwardly therefrom to function in a manner generally similar to that provided on any vessel which travels on water. While the keel is shown as being fixed to the hull 15 in a slot therein from which the keel extends, it must be recognized that it is within the spirit and scope of this invention to affix the keel to the bottom of the hull in any suitable or desirable manner. The forward end of the keel 29 is inclined forwardly and upwardly as at 31 and a rudder 33 is provided on the aft end of the keel for purposes which will be described.

Substantially midway between the bow and the stern of the hull 15 of the trolling ski and on one side thereof a cut-out section 35 is provided, the upper portion of the aft wall of this cut-out section being inclined upwardly and rearwardly as at 37 for a purpose to be hereinafter described. The cut-out section 35, as will be apparent as this description proceeds, provides on a side of the hull of the trolling ski a recess for receiving the means for releasably attaching the fish line and leader to the trolling ski.

The numeral 39 has been used to designate in its entirety the means or mechanism for releasably connecting the leader to the trolling ski until a fish strikes the lure, or until the fisherman jerks his rod to exert a pull on that fish line. This means or mechanism 39 is mounted within the recess 35 so that no parts thereof extend laterally beyond the side of the hull 15 of the trolling ski. It will thus be evident, since no elements of this mechanism extend laterally of the hull, that there will be no deterrent to the streamlined action of the trolling ski. The mechanism 39 for releasably attaching the leader to the trolling ski comprises a generally N-shaped base supporting member which is designated generally by the numeral 41. The N-shaped base supporting member 41 consists of a rearwardly and downwardly inclined length 43 which is fixed to the inner wall of the cut-out section 35 by means of screws or the like 45. From the upper end of the length 43, downwardly extends a relatively short length 45' from the lower end of which outwardly extends, at substantially right angles thereto, a guide flange 47, from the outer end of which extends rearwardly an anchor member 49 having three spaced apart apertures 51 therein. Below and integrally formed with the anchor member 49 is a rearwardly extending bracket 53 which is secured to the inner wall of the cut-out section by means of a screw or the like 55. Integrally formed and extending outwardly from the base supporting member and disposed below the rearwardly extending bracket 53 is an outwardly extending guide flange 56, the guide flange 47 and the guide flange 56 each having an aperture 58 therein and these apertures in these two flanges being in vertical alignment for a purpose to be hereinafter described. A vertically disposed plate member 57 is preferably integrally formed with the inclined length 43 and extends above and below the lower end of said inclined length. The vertically disposed plate mmeber 57 at its upper end is bent to provide an outwardly extending guide flange 59 which is provided with a fore and aft extending slot 61. At its lower end the vertically disposed plate member 57 is again bent to provide an outwardly extending flange 63 from the outer edge of which downwardly extends a pivot support member 65.

From consideration of the drawings and the above disclosure, it will be appreciated that the N-shaped base supporting structure and the elements integrally formed therewith are fixed to the hull 15 of the trolling ski so that they are stationary and immovable. The mechanism for releasably connecting the leader to the trolling ski is all operatively mounted and supported on the N-shaped base supporting member 41 as will now be described in detail.

The mechanism for releasably connecting the leader includes an arm 67 which, as will become clear, is disposed in generally vertical position and is provided with at least three vertically spaced apart apertures 69 therein. The arm 67 extends through the slot 61 in the guide flange 59 and extends thereabove. It will be observed that the length of the slot 61 is greater than the width of the arm 69 so that, for purposes to be described, the arm 67 may have limited rocking movement within the slot 61. At its lower end the arm 67 is pivotally mounted in the pivot support member 65 by means of a pivot pin 71. Thus, the arm 67 is capable of rocking motion on pivot 71 and within limits imposed by slot 61.

I provide an elongated operating lever 73 which extends generally in a fore and aft direction relative to the hull 15. The operating lever is of generally inverted U-shaped cross section and is provided with an inwardly and laterally extending flange 75 thereon which is adjacent to but removed slightly rearwardly from the forward nose 76 of the operating lever. At its rear end, the two legs of the operating lever 73 extend downwardly as at 77 and 79 and are pivotally operatively mounted to the upper end of the arm 67 by means of a pivot pin 81. It will thus be apparent in view of the inverted U-shaped configuration of the operating lever that the two legs 77 and 79 are spaced apart providng a space therebetween. Fixed to and extending rearwardly and upwardly from the operating lever 73 is a trigger 83, the angled position of the trigger with respect to the operating lever being such that there is a free area between the aft ends of the two legs 77 and 79 and the trigger. It is preferable to place on this trigger a leader clamp pad 85 for a purpose which will become apparent as this description proceeds.

An elongated leader locking rod 87 is provided and at its rear end extends between the legs 77 and 79 of the operating lever 73. The locking rod 87 is mounted on the pivot pin 81 between the depending legs 77 and 79. The N-shaped base supporting member 41 at the upper end of the inclined length 43 is provided with a forwardly extending section 89 which extends over the top of the trolling ski hull as is clearly disclosed in FIG. 8 of the drawings. At its forward end, the section 89 curvedly extends upwardly and rearwardly providing an upstanding member 91 which is slotted as at 93. This upstanding member 91 with its slot 93 provides a guide and movement-limiting means for the locking rod 87, and a rearwardly extending curved lip 92 which functions as a stop for the operating lever. This will be apparent from careful consideration of the drawings wherein it is clear that the forward end of the locking rod 87 extends through the slot 93 and that a portion 95 of the locking rod extends forwardly beyond the upstanding section 91.

A coiled tension spring 97 having anchor ends 99 extending therefrom is positioned and extends between the anchor member 49 and the vertically positioned arm 67, one anchor end 99 is positioned in an aperture 69 in the vertically positioned arm 67 while the other anchoring end 99 is hooked into one of the apertures 51 in the anchor member 49. Since the anchor member 49 is fixed and the vertically disposed arm 67 may pivot on the pivot pin 71 within the limits defined by the length of the slot 61, the said vertically positioned arm will at all times be biased forwardly by the tension spring 97. It is to be recognized that the plurality of apertures 51 and 69 which are provided for receiving the anchor ends 99 of the tension spring 97 permit the tension on the spring to be varied in accordance with the particulaar aperture which the ends may be received in. This is a significant characteristic of the mechanism for releasably connecting the leader to the trolling ski for the tension on the spring may be varied depending upon the weight of the lure which is being used and also on the speed of the towing boat.

Now that the mechanism for releasably connecting the leader to the trolling ski has been described in detail, it will be evident that the operating lever may rock in a more or less up and down motion on the pivot pin 81 and the operating lever may also rock in a generally fore and aft motion along with the vertically disposed arm 67 on the pivot pin 71, and in this generally fore and aft rocking motion the locking rod 87 will also rock in a fore and aft motion, but such rocking of the locking rod 87 in a rearward direction will be insufficient to remove the forward portion 95 of the locking rod from its position extending through the slot 93 in the section 91. It will be further understood that the inclined rear wall 37 of the cut-out section 35 permits this fore and aft pivoting motion of the operating lever 73 on the pivot pin 71.

The invention also includes a tow line latch operating rod 101 which is vertically disposed and extends slidably through the apertures 58 in the guide flanges 47 and 56, and also slidably extends through an aperture which is provided in the forwardly extending section 89. As will be clear from consideration of the drawings, the guide rod is so disposed in the mechanism that its upper end engages the laterally extending flange 75 on the operating lever 73. At its lower end below the guide flange 56, the tow line latch operating rod 101 is angled to provide a forwardly extending portion 103 which at its forwardmost end is bent to provide a nose 105 which extends through an aperture 107 in the rear end of a leaf spring resilient arm 109. The resilient arm 109 may be of any desirable cross sectional configuration and, as will be apparent from consideration of the drawings, extends forwardly and is preferably integrally formed with a base plate designated generally by the numeral 111 which fixed at its forward end to the underside of the hull by nails, screws or the like which extend into and through holes 113.

It is to be appreciated that the resilient arm 109 is formed of any suitable relatively light weight, preferably metallic material and has a degree of resilience so that when the operating rod 101 is depressed in a manner as will be explained, the arm 109 will be pressed downwardly, and when the depressing pressure upon the operating rod is released, it will move upwardly under the returning resilience of the arm 109 in assuming its normal non-flexed condition.

The base plate 111 (see FIG. 8) is provided with a rearwardly extending slot 115 therein, this slot extends rearwardly to a point forwardly spaced from the rear edge 116 of the base plate providing a non-slotted solid transverse section 117 which is of substantially the same width as the width of the base plate. The resilient arm 109 extends to one side of the transverse section 117 as at 118 and is integrally formed therewith. It is to be understood that the resilient arm 109 extends forwardly along the bottom side of the hull of the ski and is laterally disposed with respect to the keel and is positioned on the same side thereof as is the mechanism for releasably attaching the fish line and leader to the ski. It is significant to note that the transverse section 117 is free of and is not secured to the hull 15 of the trolling ski so that, as will become apparent, this transverse section may be flexed away from the hull under the action of the resilient arm 109. The transverse section 117 extends across the underside of the hull to the opposite side of the keel thereof from that side to which the mechanism for releasably attaching the fish line and leader to the ski is mounted. It is preferable that the upper portion of the keel 29 be cut back as at 119 (see FIG. 5) to provide ample room for the transverse section to extend from one side of the keel to the other.

Integrally formed with and extending rearwardly from the opposite side of the transverse section 117 is a latching arm 121 provided with a latching shoulder 123 from which rearwardly extends a relatively short tongue 125. The latching arm 121 is formed of the same material as the resilient arm 109 and the transverse section 117 so that it is endowed with a degree of resiliency and will flex with the transverse section 117. It will also appear from consideration of the drawings that the latching shoulder 123 extends downwardly from the latching arm 121.

The numeral 127 has been used to designate in its entirety the means for releasably attaching the tow line to the trolling ski. This means 127 extends laterally from the side of the hull of the trolling ski which is opposite to that side upon which the mechanism for releasably attaching the fish line and leader to the ski is mounted. The means 127 comprises a fixed and immovable arm member designated generally by the numeral 129. At its inner end the arm 129 is provided with an upstanding plate member 131 which is fixed to the hull by being imbedded in a slot provided in the bottom of the hull. It is to be clearly understood that the immovable arm 129 may be fixed in any suitable manner to the hull to extend laterally therefrom and the fixation of the plate 131 in a slot in the hull is shown merely by way of example and not by way of limitation. It will be further apparent that the section 133 which depends from the plate 131 is received in the cut out section 119 in the keel. Extending laterally outwardly from the lower end of the section 133 and from the hull is a supporting arm 135 having a hooked nose 137 and having adjacent its outer end an aperture 139. A swinging tow line locking and releasing member 141 is provided which co-acts with the fixed arm 135 and may pivot or swing relative thereto due to the fact that the swinging arm 141 is pivotably mounted for pivoting action on the fixed arm 135 by means of a pivot pin 143 which extends through an aperture 145 and also the aperture 139 in the fixed arm 135. The swinging arm 141 is provided with a stop flange 147. At its outer end the swinging arm 141 is formed with a hook like nose 149 which in tow line holding and locking position co-acts with the hooked nose 137 on the fixed arm 135. Referring particularly to FIG. 6 of the drawings, the co-action of the elements 137 and 149 providing opening 151 is shown. The tow line is releasably locked in opening 151 as will be hereinafter described.

As has been hereinbefore described, before a fish strikes the lure 13 each towing ski is towed from the towing boat 3 by means of a tow line 5 which is releasably attached by the means 127 to the side of the trolling ski. On the apex of the conical bow 17 of the trolling ski is fixed an eye 151. A link plate 153′ (see FIG. 4) is provided and this link plate is formed with an elongated opening 155 therein a relatively small aperture 157, the opening and aperture being spaced apart. The tow line 5 from the boat extends through the aperture 157 in the link plate and then an extension 159 in the nature of a towing bridle extends to and is fixed to the eye 151 on the bow of the trolling ski. Any suitable swivel type element 153 having oppositely extending eyes may be used to connect the bridle 159 to the eye. So that the towing line 5 and the bridle 159 will not be able to move in the opening 157, a knot 161 may be provided on these lines. It has been mentioned that each towing ski is provided with a rudder 33 and since, prior to the fish striking the lure, the skis are towed from an attachment at the side of the ski, the rudders on the skis on the port side of the towing boat are trimmed to bias the ski to a direction away from the boat so as to offset the action of the tow line 5 urging the ski toward the boat. It will be appreciated that the skis on the starboard side of the boat will have their rudders trimmed in the opposite direction for the same purposes. It is within the skill of the art to provide any suitable type of rudder and any suitable means for trimming the rudder, and thus it is not thought necessary to describe any particular type of rudder and rudder adjusting means.

Positioned rearwardly of the trigger 83, I provide a staple, eye or the like 10 which is imbedded in the hull 15 of the ski a sufficient distance to provide a free area 12 between the staple 10 and the hull 15. The fish line 9 from the fishing rod on the boat is threaded through the free area 12 to provide a length 14 which extends from the staple or the like to the trigger 83. With the means 39, for releasably connecting the leader to the trolling ski, in inoperative uncocked position with the operating lever in its uppermost position as shown in FIG. 5 of the drawings, the leader 11 will extend through the staple and the length 14 thereof will extend along one side of the pad 85 and across the forward portion thereof and then rearwardly therefrom to extend as at 16 through the staple and actually being a part of the leader 11 will extend rearwardly therefrom to carry a lure on its rear end. It will be understood that the fish line 9 constitutes a forward length of the leader 11 and the fish line 9 extends to the sportsman's rod on the towing boat. It will be further appreciated that the lengths 14 and 16 form a part of the fish line 9 and the leader 11. With the leader 11 and fish line 9 threaded through the staple and about the pad 85 on the trigger 83 to provide the lengths 14 and 16, all as disclosed and explained, the operating lever 73 is then pivoted downwardly on the pivot 81 and such downwardly pivoting motion of the operating lever causes the trigger to rock forwardly so that the rear clamping portion 88 of the locking rod 87 clamps against the length of the leader 11 which is extended across the forward part of the pad 85 to maintain and releasably lock it in proper position between clamping portion 88 and the pad. It will be clear that the rocking of the operating lever on the pivot pin 81 does not cause any movement in the locking rod 87. In FIG. 9 of the drawings this operation is shown with the operating lever 73 being rocked downwardly on pivot pin 81 and trigger 83 also rocking forwardly to cause the clamping end 88 of the operating rod 87 to clamp against the length of leader extending across the pad. In FIG. 10 the mechanism 39 is illustrated in fully cocked and operative position with the nose 76 of the operating lever being held in its downwardly cocked operative position by means of the lip 92 of the upstanding member 91.

When the mechanism 39 is in fully cocked, operative position as disclosed in FIG. 10 of the drawings, the operating rod 101 is forced downwardly because of its engagement with the flange 75 which is provided on the operating lever 73. This depressed condition of the operating rod 101 also flexes the resilient arm 109 downwardly and away from the bottom of the hull as disclosed in FIG. 10. This downward deflection of the resilient arm 109 also produces a downward deflection of the transverse section 117 and the entire length of the latching arm 121, including latching shoulder 123. The swinging arm 141 of the means 127 is swung on its pivot 143 into the position illustrated in phantom lines in FIG. 4 of the drawings. With this arm 141 swung into the position as disclosed in FIG. 4, the hook like noses 137 and 149 are separated and the link plate 153' with the tow line 5 and the bridle 159 immovably extending through the aperture 157, the hook like nose 137 is received in the elongated opening 155 of the link plate, whereupon the swinging arm 141 is pivoted until it is substantially parallel and disposed above the immovable arm 135 so that the hook like nose 149 of arm 141 closes the opening 151 and the link plate 153' is securely locked in such opening by the noses as illustrated in FIG. 6 of the drawings.

Since the resilient arm 109 is depressed, the transverse section 117 is depressed, the latching arm 121 is likewise depressed as is the locking shoulder 123 and the tongue 125. Since the latching arm 121 is operatively positioned above the swinging arm 141, when this latching arm is depressed and the latching shoulder is depressed, the shoulder will move into position abutting the edge of the swinging arm 141 to prevent it from having pivotal action relative to the immovable arm 135 (see FIG. 12). When all of the various elements and mechanism are in operative cocked positions as just described and the trolling ski is being towed from the side thereof by means of the link plate being releasably maintained within the noses of the arms 135 and 141, the ski is in readiness for placing in the water and being towed by a boat so that the lure will be drawn through the water.

When a fish strikes the lure, the leader 11 will be jerked rearwardly by the strike and will pull the trigger 83 substantially rearwardly to thereby cause the operating lever to move rearwardly on its pivot 71 against the biasing action of the spring 97, which as has been mentioned, the tension thereof may be adjusted as explained above. This rocking motion of the trigger and its associated operating lever causes the rearward movement of the operating lever 73 to a position released from the lip 92 so that the operating lever will rock upwardly to the position illustrated in FIG. 8 of the drawings, this occurring because of the continued pulling on the leader by the fish. Since the locking rod 87 does not move rearwardly with the operating lever, the leader and the fishing line 9 will be released entirely from the clamped position and from the ski and the fisherman with his rod may play and land the fish independently of the trolling ski.

When the mechanism for releasably attaching the leader and the fish line to the ski is operated as described to release the fish line and the leader, the operating lever's upward movement also allows the operating rod 101 to move upwardly under the resilient action of the resilient arm 109. This upward movement of the resilient arm 108 into nonflexed uppermost position also permits the transverse section 117 and the latching rod 121 to flex upwardly into normal position to move the shoulder 123 upwardly into unlatched position, (see FIG. 11) so that the swinging arm 141, due to the pulling force of the tow line, will be swung into tow line releasing position, as disclosed in phantom lines 141 in FIG. 4, to release the link plate 153' thereby releasing the tow line to its position fixed in the eye 151 which extends from the bow of the trolling ski so that the ski will be towed from its bow and will assume retrieval position substantially to the stern of the boat, (see FIG. 3).

I have also provided ingenious means whereby the fisherman by a proper manipulation of his rod may trip the mechanism 39 so that, as explained fully in the two next above paragraphs, the line will be released from the ski and simultaneously therewith the tow line will be released from the side of the ski and will move forwardly to the eye at the bow of the ski. The fisherman by a jerk on his rod will produce a pull on the line 9 which is threaded through the staple and about the trigger 83 to thereby pull the trigger rearwardly to cause automatic release of the line from the ski and also from the staple so that the fisherman may troll if he so wishes without his line being connected to the ski. Thus, the mechanism 39 may be tripped in two ways; 1. by the pull of a fish as it strikes the lure, and 2. by the jerking of the rod by the fisherman to cause a pull on the fishing line.

What is claimed is:

1. A trolling ski adapted to be towed along the surface of the water by a towing medium, said ski being formed of a buoyant material, a fishing leader extending from a fishing rod to said ski and from said ski into the water for towing behind said ski and a lure fixed on the end of said leader in the water, mechanism provided on said ski for releasably attaching said leader to said ski, a tow line fixed at one end to the towing medium and at the other end to the bow of said ski, means provided on said ski for releasably attaching the tow line thereto, said means being spaced from the bow of the ski, the tow line being releasably attached to said means along its length between the fixed ends thereof, said being actuable to release said leader from said mechanism a fish strikes the lure, and actuating means extending between and operatively connecting said mechanism and said first named means together, said actuating means being actuable when said mechanism is actuated to release said leader therefrom and the actuation of said actuating means causing substantially simultaneous operation of said first named means releasing the tow line therefrom so that the ski will then be towed from the bow thereof.

2. A trolling ski in accordance with claim 1, wherein said ski is of steamlined, elongated configuration and said mechanism is mounted on one side of said ski and said means is mounted on the opposite side of said ski.

3. A trolling ski in accordance with claim 1 wherein said mechanism includes triggering means and said leader is releasably connected thereto and biasing means connected to said triggering means and operative to releasably maintain said triggering means in position releasably maintaining said leader connected thereto, the pull on the fishing leader occasioned by the strike of a fish on the lure causing leader releasing operation of said triggering means overcoming the tension of said biasing means.

4. A trolling ski in accordance with claim 3, wherein said triggering means of said mechanism includes an operating lever and a trigger, said operating lever and trigger being formed to move together, said leader being in engagement with said trigger, means on said ski for operatively mounting said mechanism, including said operating lever thereon, said mounting means providing pivot means for said operating lever and trigger providing vertical rocking motion thereof, locking means included in said mechanism for engaging and releasably maintaining said leader on said trigger, said locking means being immovable with respect to said operating lever and trigger in their vertical rocking motion, further pivot means provided on said mounting means providing fore and aft motion of said operating lever, trigger and locking means.

5. A trolling ski in accordance with claim 4, wherein a vertically positioned arm is pivotally mounted adjacent its lower end on said mounting means for fore and aft pivoting movement of said arm, and said operating lever and trigger being pivotally mounted on said arm adjacent the upper end thereof for vertical rocking movement.

6. A trolling ski in accordance with claim 5, wherein fixed means is provided for co-action with said arm to limit the fore and aft rocking motion thereof.

7. A trolling ski in accordance with claim 6, wherein said fixed means comprises a flange element having a slot therein extending fore and aft and said arm extended through said slot and said slot being of greater length than the width of the arm extending therethrough to thereby allow limited fore and aft pivoting movement of said arm.

8. A trolling ski in accordance with claim 7, wherein said biasing means is connected at its rear end to said arm and at its forward end to a fixed member on said mounting means whereby said arm is urged forwardly in the slot by said biasing means.

9. A trolling ski in accordance with claim 4, wherein operating lever retaining means is provided for releasably maintaining said mechanism in cocked position when said operating lever is downwardly rocked on its pivot means and forwardly rocked on the further pivot means to extend in position in engagement with said operating lever retaining means.

10. A trolling ski in accordance with claim 1, wherein said ski is provided with a cut-out section on one side thereof and said mechanism is operatively mounted in said cut-out section, the means being fixed to and extending laterally from the opposite side of the hull.

11. A trolling ski in accordance with claim 1, wherein said mechanism includes an operating lever mounted for pivotal vertical rocking motion to position locking said leader to said mechanism and to position releasing said leader from said mechanism, operating means engaged with and movable by said operating lever in its rocked position locking the leader to said mechanism, and said operating means being operatively connected to said means for releasably attaching the tow line to the ski, said operating means being actuated by said operating lever when it is in position maintaining the leader attached to the mechanism to cause said means to maintain the tow line in position attached to the ski, and said operating means when said operating lever is in position releasing the leader from the mechanism being operated to actuate the means to release the tow line therefrom.

12. A trolling ski in accordance with claim 11, wherein said means includes an arm fixed to said hull and extending laterally therefrom and a swingable arm pivotally mounted on said fixed arm for swinging movement relative thereto, each of said arms having hooked noses on the outer ends thereof adapted to releasably receive the tow line in an open space enclosed by said hooked noses when in tow line maintaining position, a latch engagable with said swingable arm to releasably maintain said arm in closed position, and said latch being operatively connected to said operating means whereby said latch is operable when said operating lever is in leader maintaining position and is inoperative when said operating lever is in position releasing said leader, and when said latching means in inoperative position said arm is swingable on its pivot means to tow line releasing position.

13. A trolling ski in accordance with claim 12, wherein a deflectable resilient member includes said latch and said operating means is operatively attached to said deflectable resilient member whereby upon deflection of said member by said operating means the latch is positioned for maintaining the means in two line retaining position.

14. A trolling ski in accordance with claim 1, wherein fixed means is provided on said ski rearwardly of said mechanism and the length of said fishing leader from the fishing rod extends to said fixed means and is slidable with respect thereto, the fishing leader from the aforementioned length thereof extends forwardly and is in engagement with said mechanism and extends therefrom into the water with a lure attached to the rear end thereof, whereby a jerk of the fishing rod exerts a pull on said length of the fishing leader causing automatic release of the fishing leader from the mechanism.

15. A trolling ski in accordance with claim 14, wherein said fixed means provides an eye through which the fishing leader is threaded and is slidable with respect to said fixed means, said length of said fishing leader being threaded through said eye from the opposite side thereof from said mechanism and the fishing leader extends through said eye in engagement with the mechanism.

16. A trolling ski in accordance with claim 15, wherein the loop of said eye provides an immovable bearing surface for said fishing leader to cause release of said mechanism when the fishing leader is pulled by a jerk on the rod.

* * * * *